US 8,102,624 B2

(12) United States Patent
Yamashita

(10) Patent No.: US 8,102,624 B2
(45) Date of Patent: Jan. 24, 2012

(54) PERPENDICULAR MAGNETIC RECORDING HEAD

(75) Inventor: Tomohiro Yamashita, Tokyo (JP)

(73) Assignee: TDK Corporation, Tokyo (JP)

( * ) Notice: Subject to any disclaimer, the term of this patent is extended or adjusted under 35 U.S.C. 154(b) by 933 days.

(21) Appl. No.: 12/114,952

(22) Filed: May 5, 2008

(65) Prior Publication Data

US 2008/0291580 A1 Nov. 27, 2008

(30) Foreign Application Priority Data

May 16, 2007 (JP) ................ P2007-130859

(51) Int. Cl.
*G11B 5/127* (2006.01)
*G11B 5/17* (2006.01)
(52) U.S. Cl. ................ 360/125.3; 360/123.11
(58) Field of Classification Search ............ 360/123.01, 360/123.02, 123.11, 123.12, 125.02, 125.3
See application file for complete search history.

(56) References Cited

U.S. PATENT DOCUMENTS

| | | | |
|---|---|---|---|
| 4,931,886 A * | 6/1990 | Mallary | 360/55 |
| 7,245,454 B2 * | 7/2007 | Aoki et al. | 360/125.1 |
| 7,768,744 B2 * | 8/2010 | Hsiao et al. | 360/125.18 |
| 2005/0141137 A1 | 6/2005 | Okada et al. | |

FOREIGN PATENT DOCUMENTS

| | | | |
|---|---|---|---|
| JP | 55087325 A | * | 7/1980 |
| JP | A 2005-100520 | | 4/2005 |
| JP | 2005122831 A | * | 5/2005 |
| JP | A 2005-190518 | | 7/2005 |
| JP | 2006216098 A | * | 8/2006 |
| JP | A 2006-216098 | | 8/2006 |

OTHER PUBLICATIONS

English machien translation of JP 2006-216098 A to Tagami, published on Aug. 17, 2007.*

* cited by examiner

*Primary Examiner* — Will J Klimowicz
(74) *Attorney, Agent, or Firm* — Oliff & Berridge, PLC

(57) ABSTRACT

In a perpendicular magnetic recording head having a main magnetic pole layer and a return yoke layer which are laminated with a magnetic gap layer interposed therebetween on a medium-opposing surface, a pair of side coils constituting respective electrically closed circuits on a surface parallel to the medium-opposing surface are provided on both sides in a track width direction of a magnetic pole part of the main magnetic pole layer. When a leakage magnetic field spreading from the magnetic pole part of the main magnetic pole layer passes through the pair of side coils, the pair of side coils generate a demagnetizing field in such a direction as to cancel a magnetic flux change thereof, thereby preventing the leakage magnetic flux from spreading.

7 Claims, 15 Drawing Sheets

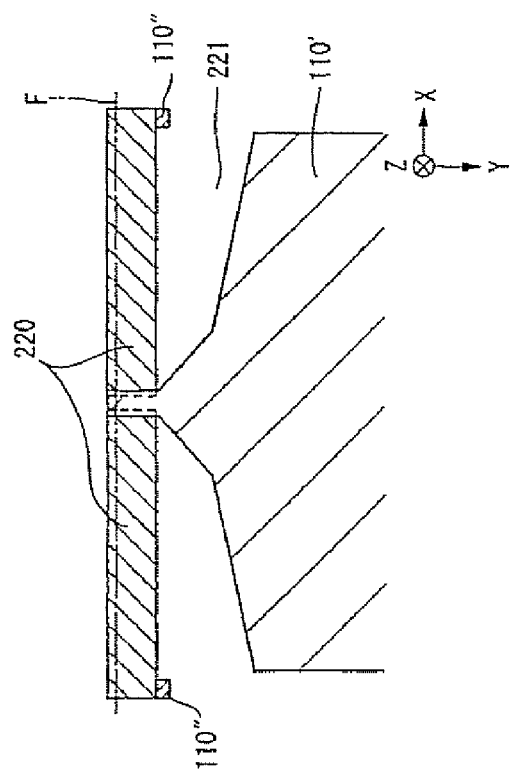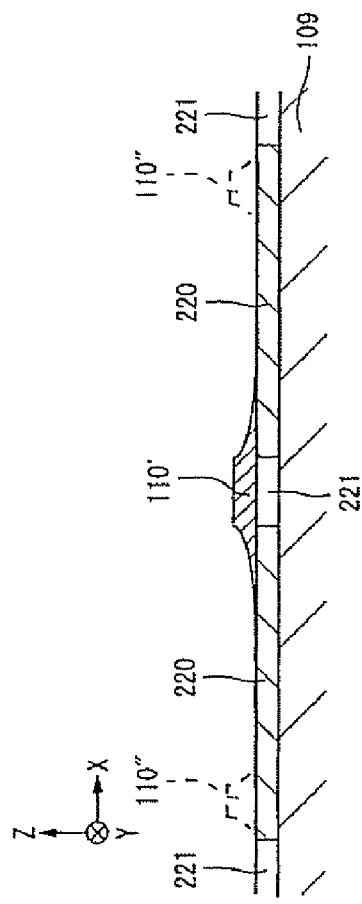
Fig.7B
Fig.7A

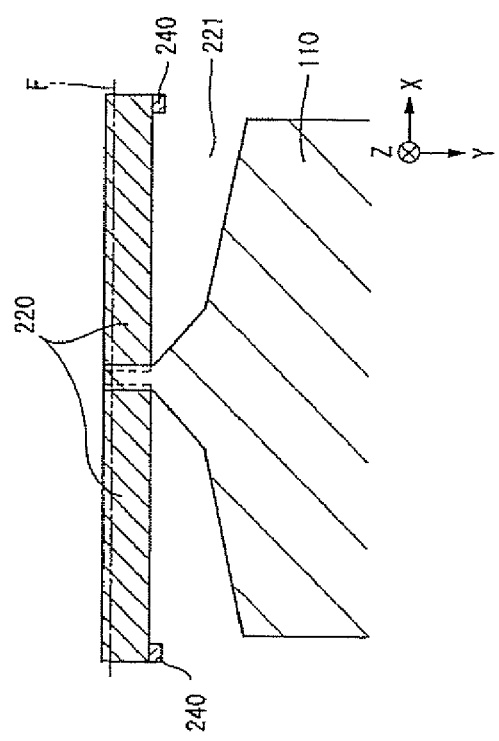
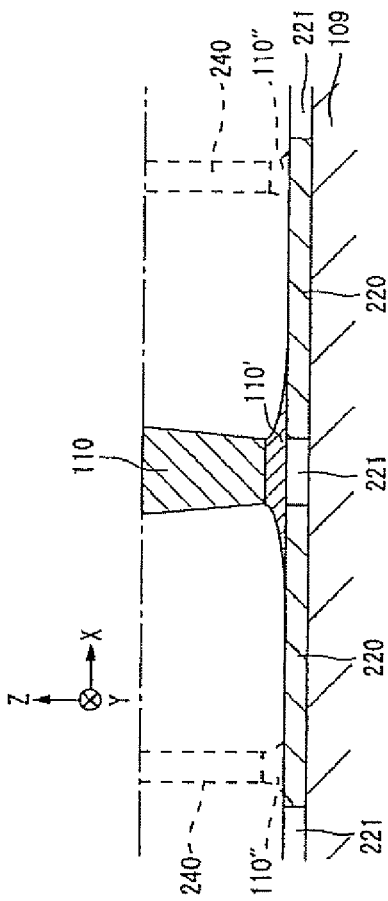
Fig.8A
Fig.8B

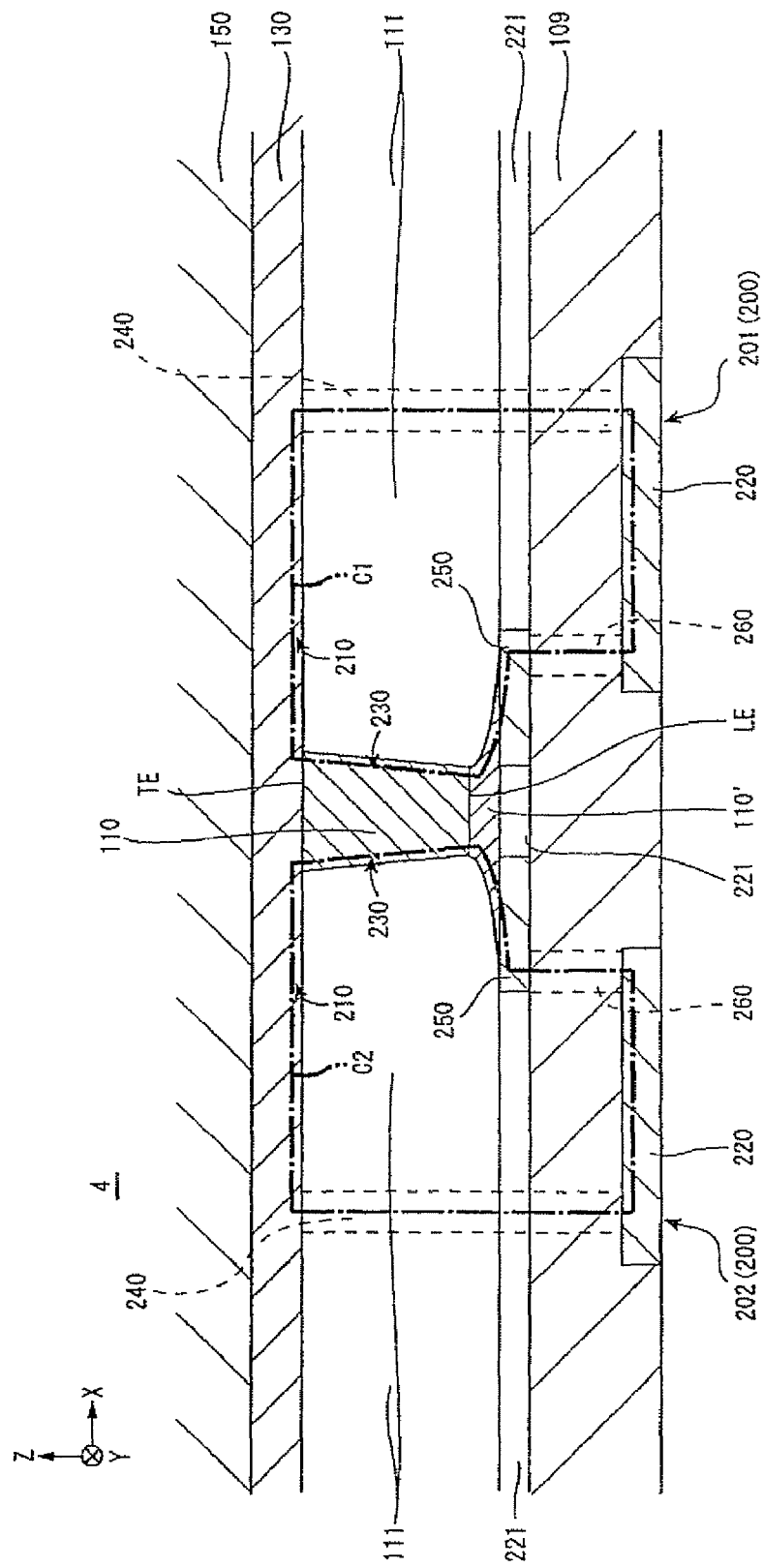

PERPENDICULAR MAGNETIC RECORDING HEAD

BACKGROUND OF THE INVENTION

1. Field of the Invention

The present invention relates to a perpendicular magnetic recording head which performs a recording action by applying a recording magnetic field perpendicularly to a recording medium plane.

2. Related Background Art

As is well-known, a perpendicular magnetic recording head includes a main magnetic pole layer and a return yoke layer which are laminated with a predetermined distance therebetween on a surface opposing a recording medium and are magnetically coupled to each other on the deeper side of the medium-opposing surface in the height direction, a magnetic gap layer interposed between the main magnetic pole layer and return yoke layer on the medium-opposing surface, and a coil layer inducing a recording magnetic field between the main magnetic pole layer and return yoke layer upon energization. The recording magnetic field induced between the main magnetic pole layer and return yoke layer perpendicularly enters a hard magnetic film of the recording medium from the front end face of the main magnetic pole layer and returns to the front end face of the main magnetic pole layer through a soft magnetic film of the recording medium. This performs magnetic recording at a part opposing the front end face of the main magnetic pole layer.

A so-called shielded pole structure has recently been proposed, in which the distance (gap distance) between the main magnetic pole layer and return yoke layer on the surface opposing the recording medium is set narrow, i.e., to about 50 nm, in order to suppress the divergence of magnetic fluxes directed from the main magnetic pole layer to the return yoke layer and realize magnetic recording with less bleeding. On the other hand, the size in the track width direction of the front end face of the main magnetic pole layer, i.e., recording track width size, has been becoming narrower as hard disk drives have been attaining higher recording densities.

In a perpendicular magnetic recording head having a narrowed track, how to suppress side fringing at the time of skewing where the head is driven in a state tilted with respect to a recording medium has become a problem.

As a method of suppressing side fringing at the time of skewing, it has been known to provide a magnetic shield layer for absorbing magnetic fluxes leaking from sides of the main magnetic pole layer in the vicinity of the main magnetic pole layer as described in Patent Document 1 (Japanese Patent Application Laid-Open No. 2005-190518), for example. Patent Document 2 (Japanese Patent Application Laid-Open No. 2005-100520) and Patent Document 3 (Japanese Patent Application Laid-Open No. 2006-216098) also show such techniques.

SUMMARY OF THE INVENTION

When a magnetic shield layer is provided like a flat film surrounding the main magnetic pole layer as in Patent Document 1, however, not only leakage magnetic fluxes from sides of the main magnetic pole layer but also recording magnetic fluxes applied from the main magnetic pole layer to the recording medium are absorbed by the shield layer, whereby the recording magnetic field becomes extremely small. When the recording magnetic field intensity becomes extremely small as such, recording actions cannot be performed for recording media having a high coercivity, whereby the total recording performance will deteriorate even if the recording magnetic field gradient improves.

It is an object of the present invention to provide a perpendicular magnetic recording head which can suppress side fringing and favorably keep both of the recording magnetic field intensity and recording magnetic field gradient.

The present invention is achieved by focusing attention on the fact that, when the spread of leakage magnetic fluxes from the main magnetic pole layer is suppressed by a demagnetizing field occurring in a coil, the probability of leakage magnetic fluxes from the main magnetic pole layer reaching the recording medium is lowered, so that side fringing can be suppressed, while the recording magnetic fluxes directed from the main magnetic pole layer to the recording medium are not reduced.

Namely, the present invention is a perpendicular magnetic recording head comprising a main magnetic pole layer and a return yoke layer which are laminated with a magnetic gap layer interposed therebetween on a surface opposing a recording medium and magnetically coupled to each other on the deeper side of the medium-opposing surface in a height direction, the perpendicular magnetic recording head performing a recording action by applying a perpendicular recording magnetic field from a magnetic pole part exposed at the medium-opposing surface of the main magnetic pole layer to the recording medium; wherein a pair of side coils constituting respective electrically closed circuits on a surface parallel to the medium-opposing surface are provided on both sides in a track width direction of the magnetic pole part of the main magnetic pole layer, the pair of side coils generating a demagnetizing field in such a direction as to cancel a magnetic flux change caused by a leakage magnetic flux generated from the magnetic pole part.

The pair of side coils may be provided so as to be electrically connected to the main magnetic pole layer. It will be practical in this case if the pair of side coils are partly in contact with both side faces in the track width direction of the magnetic pole part or partly constituted by the magnetic pole part.

The pair of side coils may also be provided so as to be electrically connected to the return yoke layer. It will be practical in this case if the magnetic gap layer is made of a nonmagnetic metal material, while the pair of side coils are partly in contact with or constituted by the magnetic gap layer.

Preferably, the pair of side coils are formed by a nonmagnetic metal material film containing at least one of Ru, Ta, Au, W, Cr, Ti, Ni, Rh, Pd, Al, Cu, Ag, Sn, and Zr or a multilayer body thereof. Using the nonmagnetic metal material generates a demagnetizing field only when a magnetic flux temporally changes within the pair of side coils. Namely, no demagnetizing field occurs in the state where no temporal magnetic flux change exists. Therefore, unnecessary writing and erasing will not occur unintentionally during and after recording actions.

The pair of side coils may be either exposed or unexposed at the medium-opposing surface. When the pair of side coils have a front end part exposed at the medium-opposing surface, it will be preferred if at least the front end part is formed by a corrosion-resistant nonmagnetic metal material, specific examples of which include Ru, Ta, Au, W, Cr, Ti, and Rh, or a multilayer body thereof.

Since the demagnetizing field generated in the pair of side coils can suppress the spread of leakage magnetic fluxes from the main magnetic pole layer, the present invention yields a perpendicular magnetic recording head which can suppress side fringing, so as to improve the recording magnetic field gradient, while favorably maintaining the recording magnetic field intensity.

BRIEF DESCRIPTION OF THE DRAWINGS

FIG. 7A is a sectional view showing a step subsequent to that of FIG. 6A;

FIG. 7B is a plan views showing a step subsequent to that of FIG. 6B;

FIG. 8A is a sectional view showing a step subsequent to that of FIG. 7A;

FIG. 8B is a plan view showing a step subsequent to that of FIG. 7B;

FIG. 15 is a sectional view showing the lamination structure of the perpendicular magnetic recording head in accordance with the fourth embodiment of the present invention as seen from the medium-opposing surface side.

DESCRIPTION OF THE PREFERRED EMBODIMENT

In the following, the present invention will be explained with reference to the drawings. In each drawing, X, Y, and Z directions are defined by the track width direction, the height direction, and the laminating direction (thickness direction) of layers constituting a perpendicular magnetic recording head, respectively.

Figure 1:
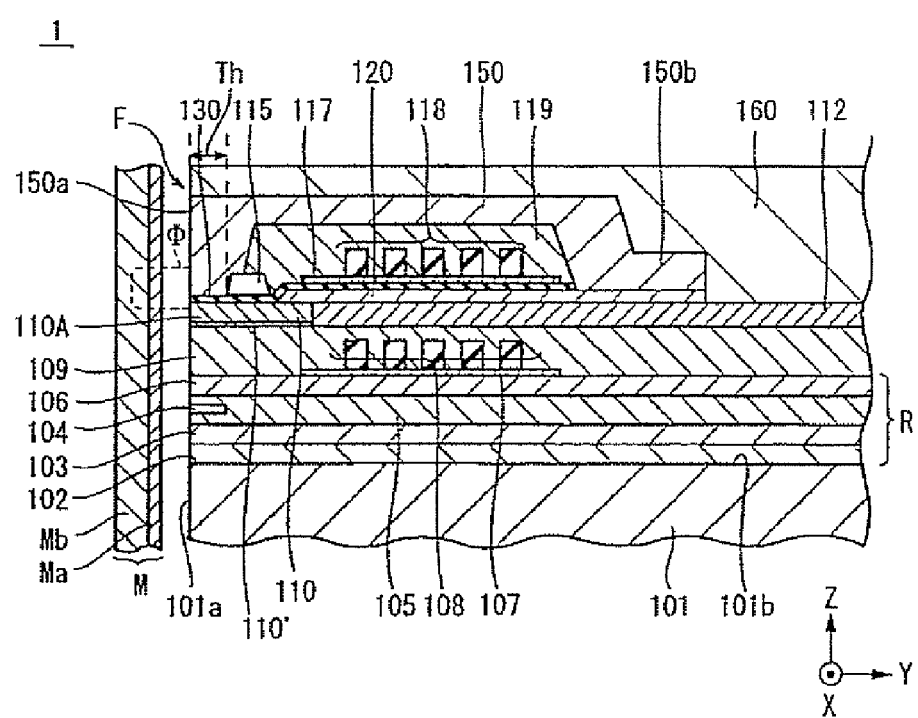
FIG. 1 is a sectional view showing the lamination structure of the perpendicular magnetic recording head in accordance with the first embodiment of the present invention.
Figure 2:
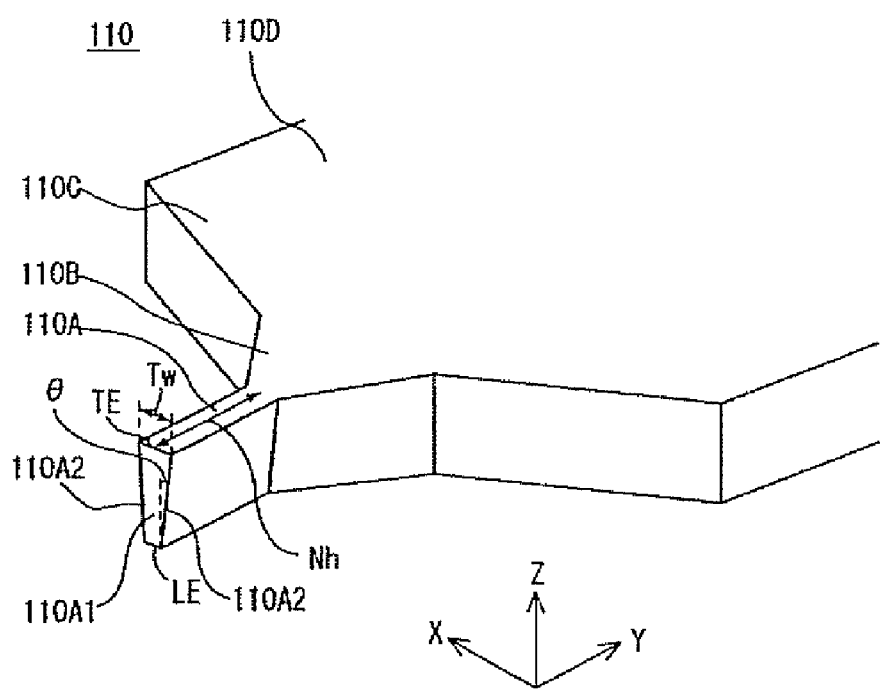
FIG. 2 is a perspective view for explaining the main magnetic pole form.

FIGS. 1 to 10 show the perpendicular magnetic recording head 1 in accordance with a first embodiment of the present invention. FIG. 1 is a vertical sectional view showing the overall structure of the perpendicular magnetic recording head 1, while FIG. 2 is a perspective view for explaining the main magnetic pole form.

The perpendicular magnetic recording head 1 provides a recording medium M with a recording magnetic flux Φ perpendicular thereto, thereby perpendicularly magnetizing a hard magnetic film Ma of the recording medium M. The recording medium M has the hard magnetic film Ma with a higher remanent magnetization on the medium surface side and a soft magnetic film Mb with a higher magnetic permeability on the inner side of the hard magnetic film Ma. The recording medium M is shaped like a disk, for example, and rotated about the center of the disk as a rotary axis. A slider 101 is formed by a nonmagnetic material such as $Al_2O_3.TiC$. The slider 101 has a medium-opposing surface 101a opposing the recording medium M. As the recording medium M rotates, a surface airflow levitates the slider 101 from the surface of the recording medium M.

The trailing-side end face 101b of the slider 101 is formed with a nonmagnetic insulating layer 102 made of an inorganic material such as $Al_2O_3$ or $SiO_2$, while a reproducing part R is formed on the nonmagnetic insulating layer 102. The reproducing part R has a lower shield layer 103, an upper shield layer 106, an inorganic insulating layer (gap insulating layer) 105 filling the gap between the lower and upper shield layers 103, 106, and a reproducing device 104 positioned within the inorganic insulating layer 105. The reproducing device 104 is a magnetoresistive device such as AMR, GMR, or TMR.

By way of a coil insulating foundation layer 107, a first coil layer 108 constituted by a plurality of lines made of a conductive material is formed on the upper shield layer 106. The first coil layer 108 is made of at least one nonmagnetic metal material selected from Au, Ag, Pt, Cu, Cr, Al, Ti, NP, Mo, Pd, and Rh, for example. It may have a multilayer structure in which such nonmagnetic metal materials are laminated. A coil insulating layer 109 made of $Al_2O_3$, $SiO_2$, or the like is formed about the first coil layer 108.

The upper face of the coil insulating layer 109 is made flat. A plating foundation layer 110' is formed on the flat surface, while a main magnetic pole layer 110 made of a ferromagnetic material having a high saturated magnetic flux density such as Ni—Fe, Co—Fe, or Ni—Fe—Co is formed on the plating foundation layer 110'.

As shown in FIG. 2, the main magnetic pole layer 110 has a magnetic pole part (pole straight part) 110A, a $1^{st}$ flare part 110B, a $2^{nd}$ flare part 110C, and a base part 110D successively from the medium-opposing surface F side. The magnetic pole part 110A has a front end face 110A1 exposed at the medium-opposing surface F. The size of the magnetic pole part 110A in the track width direction at the trailing edge TE is defined by a recording track width Tw, while its size in the height direction is defined by a predetermined neck height Nh. The magnetic pole part 110A uniformly yields a trapezoidal (bevel) form which is narrower on the leading edge side LE than on the trailing edge side TE throughout its length when seen from the medium-opposing surface F. Beveling the magnetic pole part 110A can reduce leakage magnetic fields reaching from the leading edge LE side to the recording medium M. At present, the recording track width Tw is about 100 to 150 nm, the neck height Nh is about 100 to 200 nm, the thickness is about 200 to 350 nm, and the bevel angle θ is about 6 to 12°. The $1^{st}$ flare part 110B is an area for narrowing the recording magnetic field from the base part 110D to the magnetic pole part 110A and expands the size in the track width direction from the magnetic pole part 110A to the deeper side in the height direction. The $2^{nd}$ flare part 110C is an area for adjusting a domain structure generated in the base part 110D after excitation such that it is oriented in the track width direction, and joins the $1^{st}$ flare part 110B and the base part 110D to each other. The main magnetic pole layer 110 of this embodiment is not formed on the whole coil insulating layer 109 but locally on only the medium-opposing surface F side thereof, and is magnetically connected to an auxiliary yoke layer 120 at the base part 110D. The auxiliary yoke layer 120 is made of a magnetic material having a saturated magnetic flux density lower than that of the main magnetic pole layer 110 and transmits magnetic fluxes of the recording magnetic field induced by the recording coil (first and second coil layers 108, 118) to the main magnetic pole layer 110. A nonmagnetic material layer 112 is formed about the main magnetic pole layer 110, and is made flat such that the upper face of the main magnetic pole layer 110 is flush with the upper face of the nonmagnetic material layer 112.

A magnetic gap layer 130 made of an inorganic nonmagnetic insulating material such as $Al_2O_3$ or $SiO_2$, for example, is formed by a thickness corresponding to a predetermined gap distance on the main magnetic pole layer 110 and auxiliary yoke layer 120. The thickness of the magnetic gap layer 130 is about 50 nm at present. On the magnetic gap layer 130, a height determining layer 115 is formed at a position retracted from the medium-opposing surface F by a predetermined throat height Th to the deeper side in the height direction, while the second coil layer 118 is formed on the deeper side of the height determining layer 115 in the height direction by way of a coil insulating foundation layer 117.

As with the first coil layer 108, the second coil layer 118 is formed by a plurality of lines made of a conductive material. For example, the second coil layer 118 is made of at least one nonmagnetic metal material selected from Au, Ag, Pt, Cu, Cr, Al, Ti, NiP, Mo, Pd, and Rh. It may have a multilayer structure in which such nomagnetic metal materials are laminated. The first and second coil layers 108, 118 are electrically connected to each other at their end parts in the track width direction (depicted X direction) so as become toroidal. The form of coil layers (magnetic field generating means) is not limited to the toroidal form, though. A coil insulating layer 119 is formed about the second coil layer 118.

A return yoke layer 150 made of a ferromagnetic material having a high saturated magnetic flux density such as Ni—Fe, Co—Fe, or Ni—Fe—Co is formed such as to extend over the coil insulating layer 119, height determining layer 115, and magnetic gap layer 130. The return yoke layer 150 has a front end face 150a, which is exposed at the medium-opposing surface F and opposes the magnetic pole part 110A of the main magnetic pole layer 110 while interposing the magnetic gap layer 130 therebetween, and a connecting part 150b magnetically connecting with the base part 110D of the main magnetic pole layer 110 through the auxiliary yoke layer 120 on the deeper side in the height direction. The throat height Th of the return yoke layer 150 is determined by the height determining layer 115. The return yoke layer 150 is covered with a protecting layer 160 made of an inorganic nonmagnetic insulating material.

Figure 3:
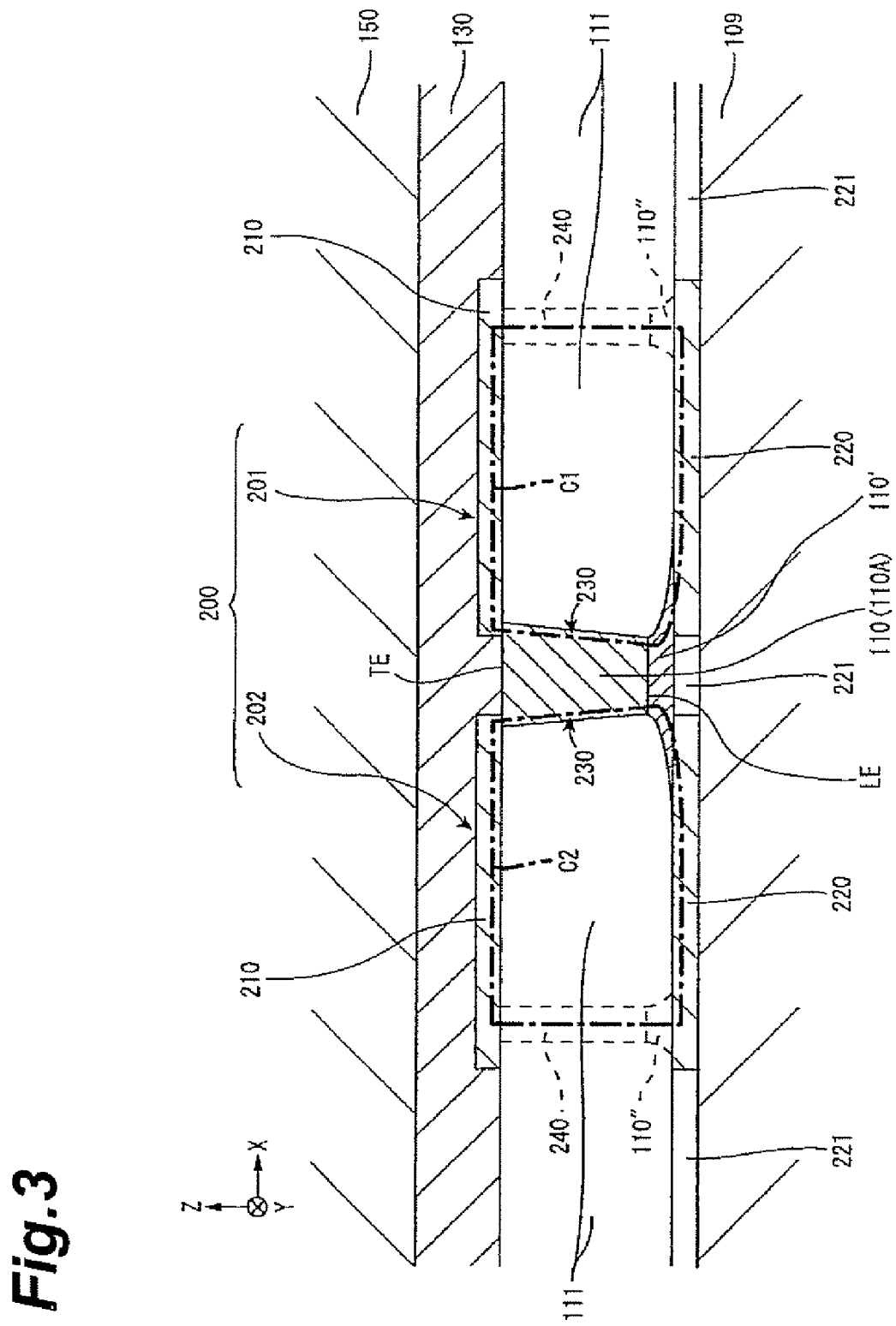
FIG. 3 is a sectional view showing the lamination structure of the perpendicular magnetic recording head as seen from the medium-opposing surface side.
Figure 4:
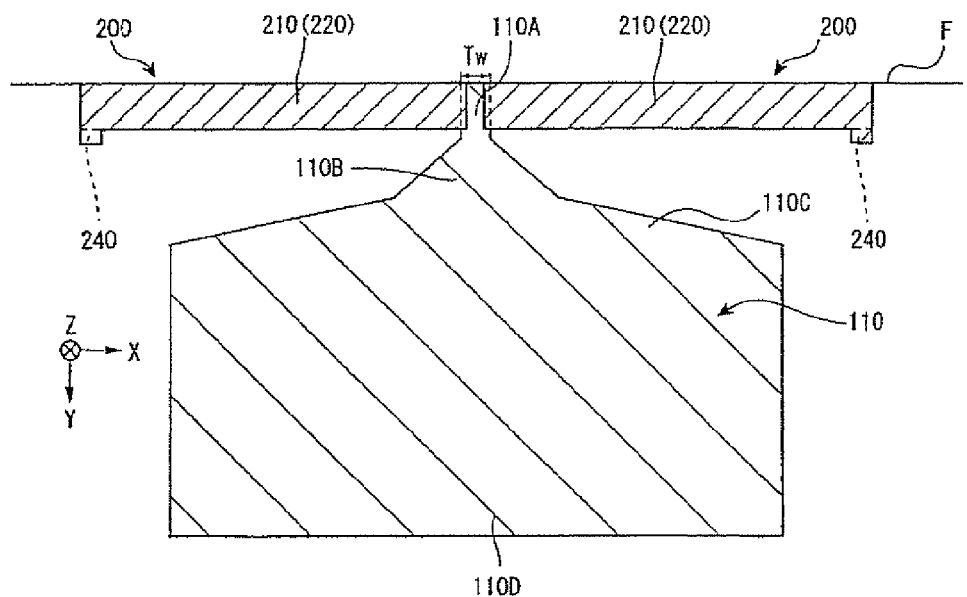
FIG. 4 is a plan view showing the positional relationship between the pair of side coils and main magnetic pole layer in FIG. 3 as seen from the upper side.
Figure 5:
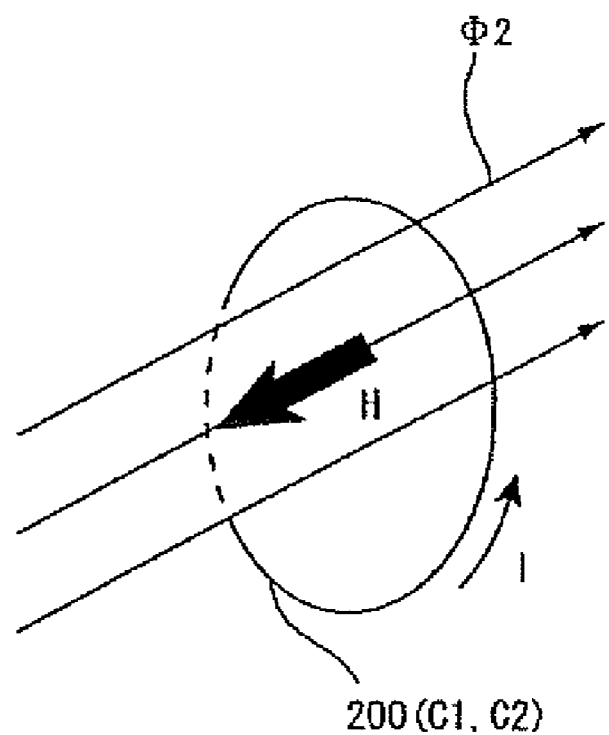
FIG. 5 is a conceptual diagram for explaining operations of the pair of side coils.

As shown in FIGS. 3 to 5, the perpendicular magnetic recording head 1 having the foregoing overall structure includes a pair of side coils 200 (201, 202) constituting respective electrically closed circuits C1, C2 on a surface (depicted XZ plane) parallel to the medium-opposing surface F on both sides in the track width direction of the magnetic pole part 110A of the main magnetic pole layer 110. The pair of side coils 201, 202 are identical to each other and thus will simply be referred to as side coils 200 in the following. FIG. 3 is a sectional view showing the multilayer structure of the perpendicular magnetic recording head 1 as seen from the medium-opposing surface F side. FIG. 4 is a plan view showing the positional relationship between the pair of side coils 200 and the main magnetic pole layer 110. FIG. 5 is a conceptual diagram for explaining operations of the pair of side coils 200.

The pair of side coils 200 are electrically connected to the main magnetic pole layer 110, and construct the closed circuits C1, C2 through the main magnetic pole layer 110, respectively. More specifically, an upper layer 210 extending in the track width direction on the trailing edge TE side of the magnetic pole part 110A of the main magnetic pole layer 110, a lower layer 220 extending in the track width direction on the leading edge LE side of the magnetic pole part 110A of the main magnetic pole layer 110, an inner contact layer 230 connecting the upper and lower layers 210, 220 to each other on the magnetic pole part 110A side, and an outer contact layer 240 connecting the upper and lower layers 210, 220 to each other on the side opposite from the magnetic pole part 110A are continuous within the depicted XZ plane, while the inner contact layer 230 is constituted by the magnetic pole part 110A. The upper layer 210, lower layer 220, and inner contact layer 230 (magnetic pole part 110A) are front end parts exposed at the medium-opposing surface F, while the outer contact layer 240 is not exposed at the medium-opposing surface F but positioned at the rear end in the height direction of the upper and lower layers 210, 220.

The upper layer 210 is formed on the nonmagnetic material layer 112 such that the end part on the magnetic pole part 110A side overlaps the magnetic pole part 110A so as to be electrically connected thereto. The lower layer 220 is formed on the coil insulating layer 109, while its end part on the magnetic pole part 110A side is positioned directly under the plating foundation layer 110' and electrically connected to the magnetic pole part 110A. The upper and lower layers 210, 220 have rectangular forms as shown in FIG. 4, in which the size in the track width direction is set equal to or slightly longer than the size in the height direction of the main magnetic pole layer 110 (from the front end face 110A1 to the rear end of the base part 110D), while the size in the height direction is set on a par with the neck height Nh of the main magnetic pole layer 110. The thickness of each of the upper and lower layers 210, 220 is about 10 to 60 nm. The size in the track width direction of the outer contact layer 240 is set smaller than that of the upper and lower layers 210, 220, specifically to about 0.2 to 2 μm. Its size in the height direction is about 0.2 to 2 μm, while the thickness corresponds to the gap between the upper and lower layers 210, 220. The forms of the upper layer 210, lower layer 220, and outer contact layer 240 can be modified in various ways without being restricted in particular.

The area surrounded by the upper layer 210, lower layer 220, and main magnetic pole layer 110 is filled with a nonmagnetic insulating material layer 111 made of $Al_2O_3$ or $SiO_2$, for example. The nonmagnetic insulating material layer 111, magnetic gap layer 130, coil insulating layer 109, and nonmagnetic material layer 112 secure insulation for the upper layer 210, lower layer 220, outer contact layer 240, and main magnetic pole layer 110.

The pair of side coils 200 may be formed by a nonmagnetic metal material film containing at least one of Ru, Ta, Au, W, Cr, Ti, Ni, Rh, Pd, Al, Cu, Ag, Sn, and Zr or a multilayer body thereof. In this embodiment, the upper and lower layers 210, 220 are formed by Ru, while the outer contact layers 240 are formed by NiFe. Ru forming the upper and lower layers 210, 220 is excellent in resistance to corrosion, and causes no problems by corrosion even when exposed at the medium-opposing surface F. In other words, it will be preferred if the upper and lower layers acting as front end parts exposed at the medium-opposing surface F are formed by a nonmagnetic metal material excellent in corrosion resistance, specific examples of which include Ru, Ta, Au, W, Cr, Ti, and Rh, or a multilayer body thereof. The main magnetic pole layer 110 is formed by NiFe.

When a temporal change occurs in a magnetic flux Φ2 penetrating through any of the side coils 200 (closed circuits C1, C2), a demagnetizing field H occurs in such a direction as to cancel the magnetic flux change, whereby a current I flows in the side coil 200 as shown in FIG. 5. Since the pair of side coils 200 are arranged on both sides in the track width direction of the magnetic pole part 110A, the temporal change occurs in the magnetic flux Φ2 at the time when a leakage magnetic flux from any of both side faces 110A2 in the track width direction of the magnetic pole part 110A is about to pass through any of the pair of side coils 200. Therefore, the leakage magnetic fluxes from the magnetic pole part 110A are suppressed by the demagnetizing field H occurring in the pair of side coils 200, so that the amount of leakage magnetic fluxes reaching from the magnetic pole part 110A to the recording medium M is reduced. Here, the recording magnetic flux directed from the magnetic pole part 110A to the recording medium M does not pass through the pair of side coils 200 and thus is not affected by the demagnetizing field H. As a consequence, side fringing is suppressed, so that the recording magnetic field gradient improves, while such a recording magnetic field intensity as to allow a recording action for the recording medium M can be maintained.

When there is no temporal change in the magnetic flux Φ2 penetrating through any of the side coils 200 (closed circuits C1, C2), none of the demagnetizing field H and current I occurs in the pair of side coils 200, so that no unnecessary writing and erasing will occur unintentionally. The pair of side coils 200 do not adversely affect unintentional writing and erasing of the magnetic pole part 110A caused by remanent magnetization.

By an undepicted driving means, the perpendicular magnetic recording head 1 is driven with a skew angle in a radial direction of the recording medium M (from its inner peripheral side to outer peripheral side or vice versa), so as to levitate in a state where the slider 101 is tilted with respect to the recording medium M (recording medium plane). When induced by energizing the recording coil (first and second coil layers 108, 118), the recording magnetic field Φ is transmitted from the auxiliary yoke layer 120 to the base part 110D of the main magnetic pole layer 110, narrowed through the $2^{nd}$ flare part 110C and $1^{st}$ flare part 110B from the base part 110D, and then perpendicularly applied as the recording magnetic field Φ from the front end face 110A1 of the magnetic pole part 110A to the recording medium M, so as to record magnetic information onto the recording medium M. Leakage magnetic fluxes occurring from the magnetic pole part 110A of the main magnetic pole layer 110 at the time of this recording action are suppressed by the demagnetizing magnetic field H generated within the pair of side coils 200 when about to pass through the side coils 200 as mentioned above and thus are harder to reach the recording medium M. Though the demagnetizing field H instantaneously occurs when a temporal change is caused in the magnetic flux Φ2 penetrating through the pair of side coils 200, the recording frequency in the recording action is on the order of 300 to 500 MHz, which is high enough to keep the leakage magnetic fluxes from reaching the recording medium M. Thus, the pair of side coils 200 can suppress the side fringing, thereby preventing problems such as recording fringing onto the recording medium M and erasing of recording information in adjacent recording tracks from occurring. The pair of side coils 200 are not involved with the recording magnetic flux directed from the magnetic pole part 110A to the recording medium M, so that the recording magnetic field intensity can be kept from decreasing, and recording performances can be improved.

With reference to FIGS. 6A to 10B, a process of manufacturing the pair of side coils 200 will be explained. Each of FIGS. 6A, 7A, 8A, 9A and 10A is a sectional view, and each of FIGS. 6B, 7B, 8B, 9B and 10B is a plan view, each showing a step of manufacturing the pair of side coils 200.

Figure 6B:
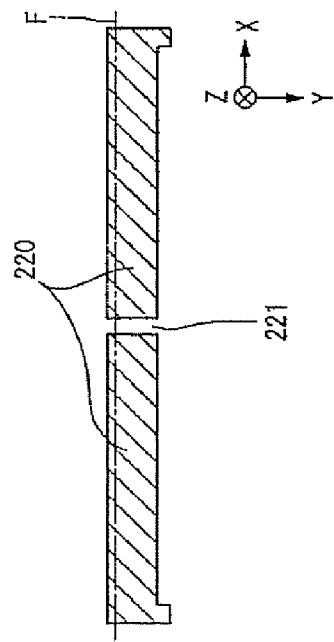
FIG. 6B is a plan view showing a step in a process of manufacturing the pair of side coils.
Figure 6A:
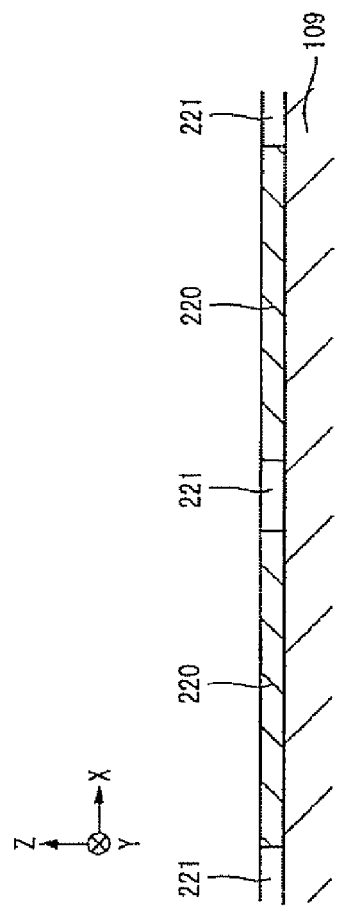
FIG. 6A is a sectional view showing a step in a process of manufacturing the pair of side coils.

First, as shown in FIGS. 6A and 6B, a pair of lower layers 220 are formed such as to be positioned on both sides in the track width direction of a main magnetic pole layer (magnetic pole part) to be formed. The pair of lower layers 220 are obtained, for example, by forming a nonmagnetic metal material film made of Ru, Ta, Au, W, or the like totally on the coil insulating layer 109, forming a resist defining a pattern form on the nonmagnetic meal material film, performing etching, and then removing the resist. The lower layers 220 have a rectangular two-dimensional form in which the size in the track width direction is set equal to or slightly longer than the size in the track width direction of the base part of the main magnetic pole layer, while the size in the height direction is set on a par with the neck height of the main magnetic pole layer, and a thickness on the order of 10 to 60 nm. A nonmagnetic insulating material layer 221 is formed about the pair of lower layers 220 so as to be flush with the upper face of the lower layers 220. The nonmagnetic insulating material layer 221 may be omitted, but is preferably formed as in this embodiment.

Next, as shown in FIGS. 7A and 7B, a step of forming the plating foundation layer 110' for forming a main magnetic pole simultaneously forms a pair of plating foundation layers 110" for forming contacts on the pair of lower layers 220. At this time, the plating foundation layer 110' for forming a main magnetic pole is provided such as to be overlaid on respective end parts on the main magnetic gap layer side of the lower layers 220. The plating foundation layers 110" for forming contacts are provided at respective rear ends of the lower layers 220 that are end parts in the height direction of the lower layers 220 on the side opposite from the main magnetic pole layer.

Subsequently, as shown in FIGS. 8A and 8B, a step of forming the main magnetic pole layer 110 by plating simultaneously forms the outer contact layers 240 by plating on the plating foundation layers 110' for forming contacts. The outer contact layers 240 are formed by plating with the same material as that of the main magnetic pole layer 110 in this embodiment in order to make them simultaneously with the main magnetic pole layer 110. However, it will be preferred if the outer contact layers 240 are formed by plating with a material such as NiP or Cu, for example, which is different from that of the main magnetic pole layer 110 in a step different from that of forming the main magnetic pole layer 110.

After forming the main magnetic pole layer 110, both side faces 110A2 in the track width direction of the main magnetic pole layer 110 (magnetic pole part 110A) are trimmed by a predetermined amount by ion milling, so as to define the recording track width Tw.

Figure 9B:
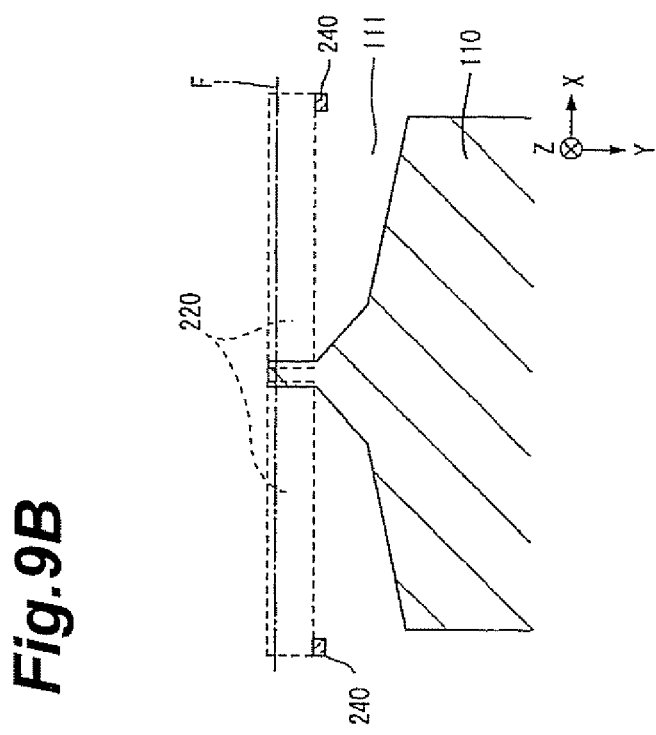
FIG. 9B is a plan view showing a step subsequent to that of FIG. 8B.
Figure 9A:
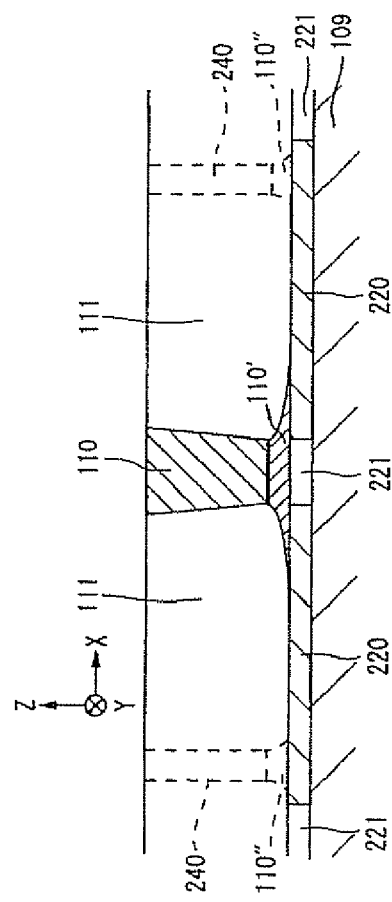
FIG. 9A is a sectional view showing a step subsequent to that of FIG. 8A.

Subsequently, as shown in FIGS. 9A and 9B, the nonmagnetic insulating material layer 111 is formed such as to bury the main magnetic pole layer 110, pair of outer contact layers 240, and their surroundings, and then subjected to polishing (CMP; Chemical Mechanical Polishing) such that the upper face of the main magnetic pole layer 110 is flush with the upper faces of the pair of outer contact layers 240.

Figure 10B:
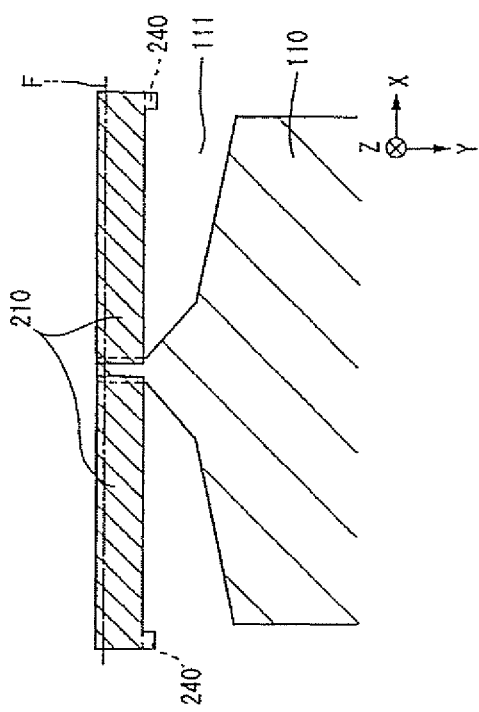
FIG. 10B is a plan views showing a step subsequent to that of FIG. 9B.
Figure 10A:
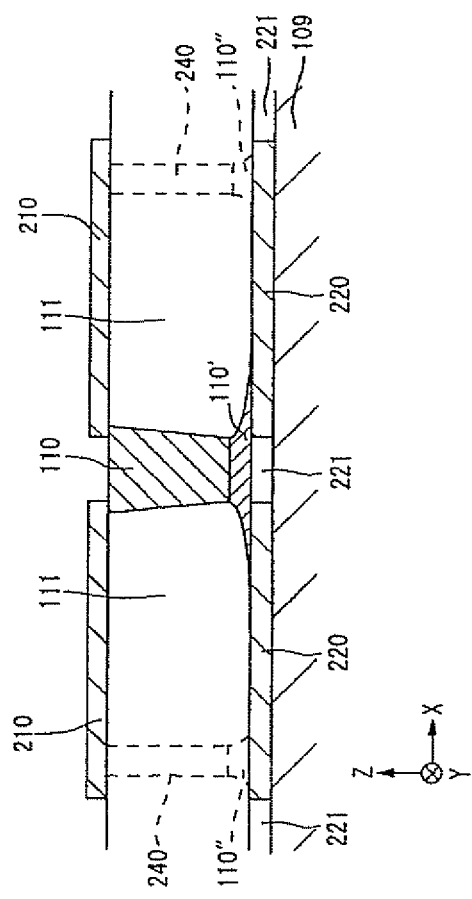
FIG. 10A is a sectional view showing a step subsequent to that of FIG. 9A.

Next, as shown in FIGS. 10A and 10B, a pair of upper layers 210 connecting the main magnetic pole layer 110 to the pair of outer contact layers 240 are formed on the flat surface formed by the main magnetic pole layer 110, pair of outer contact layers 240, and nonmagnetic insulating material layer 111. The pair of upper layers 210 are overlaid on both end parts in the track width direction of the main magnetic pole layer 110 and extended in the track width direction to the pair of outer contact layers 240.

The foregoing steps complete a pair of side coils 200 constituting closed circuits C1, C2 in which the upper layers 210, lower layers 220, and outer contact layers 240 are electrically connected together through the main magnetic pole layer 110. The magnetic gap layer 130 and return yoke layer 150 are laminated on the pair of upper layers 210.

Though the inner contact layers 230 of the pair of side coils 200 are constituted by the magnetic pole part 110A while the pair of side coils 200 are electrically connected to the magnetic pole part 110A in the first embodiment, the pair of side coils 200 may be either electrically connected to the main magnetic pole layer 110 (magnetic pole part 110A) and return yoke layer 150 or not.

Figure 11:
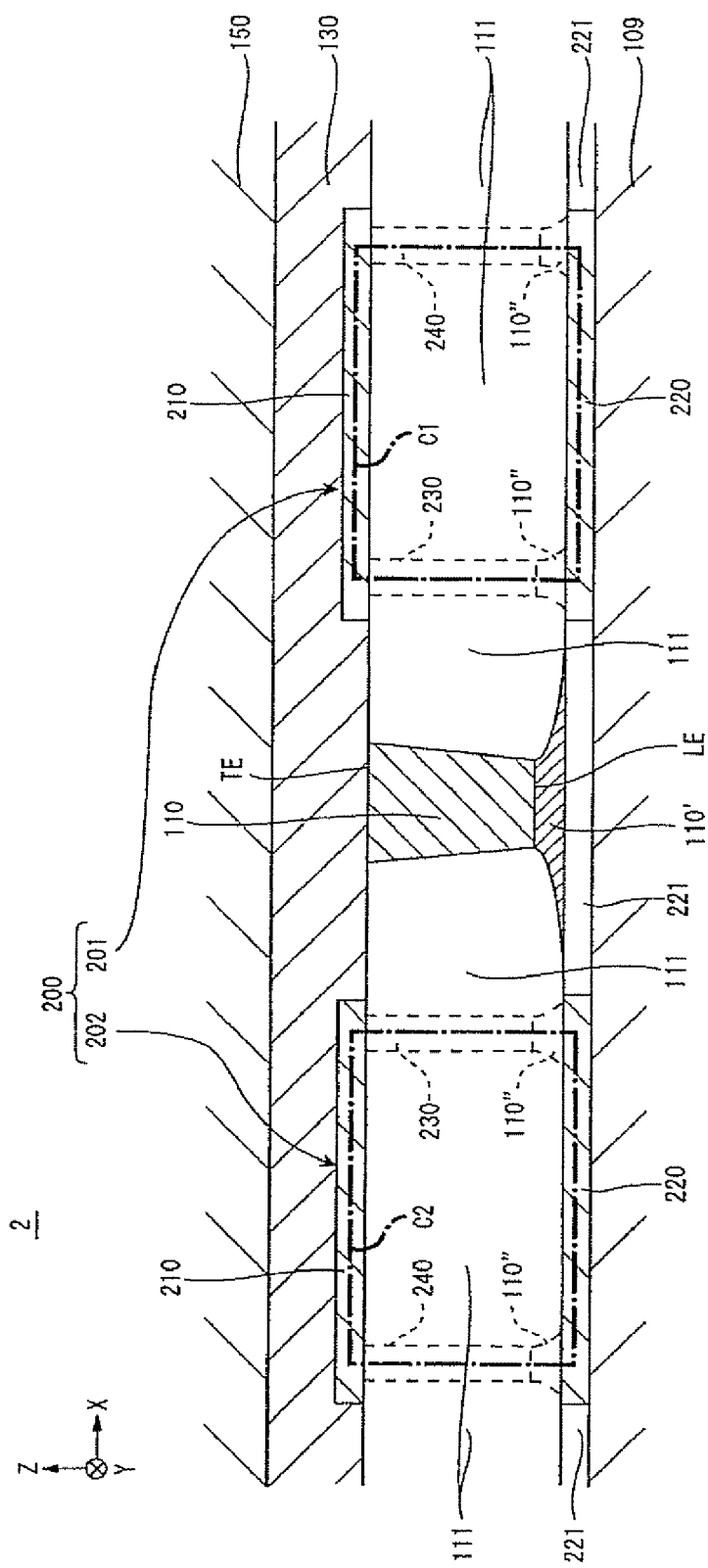
FIG. 11 is a sectional view showing the lamination structure of the perpendicular magnetic recording head in accordance with the second embodiment of the present invention as seen from the medium-opposing surface side.
Figure 12:
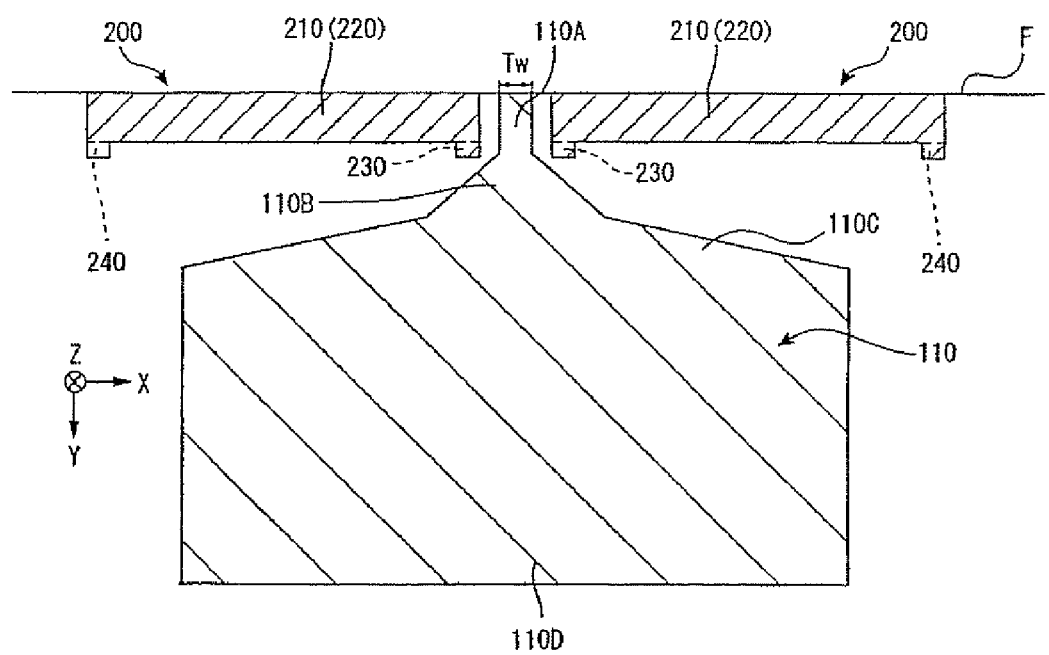
FIG. 12 is a plan view showing the positional relationship between the pair of side coils and main magnetic pole layer in FIG. 11 as seen from the upper side.

FIGS. 11 and 12 show the perpendicular magnetic recording head 2 in accordance with a second embodiment of the present invention. The perpendicular magnetic recording head 2 is a modified example of the first embodiment in which a pair of side coils 200 are provided in a state electrically unconnected to the main magnetic pole layer 110 and return yoke layer 150. Namely, inner contact layers 230 are provided separately from the magnetic pole part 110A while interposing the nonmagnetic insulating layer 111 therebetween, whereas the upper and lower layers 210, 220 are located at positions separated from the magnetic pole part 110A. The inner contact layers 230 are not exposed at the medium-opposing surface F but positioned at rear ends in the height direction of the upper and lower layers 210, 220. As with the outer contact layers 240, the inner contact layers 230 have a size in the track width direction which is smaller than that of the upper and lower layers 210, 220 and specifically set to about 0.2 to 2 µm. The size in the height direction of the outer contact layers 240 is about 0.2 µm, while the thickness corresponds to the gap between the upper and lower layers 210, 220. The second embodiment is the same as the first embodiment except that the inner contact layers 230 are provided independently and that the upper and lower layers 210, 220 are magnetically unconnected to the magnetic pole part 110A.

Figure 13:
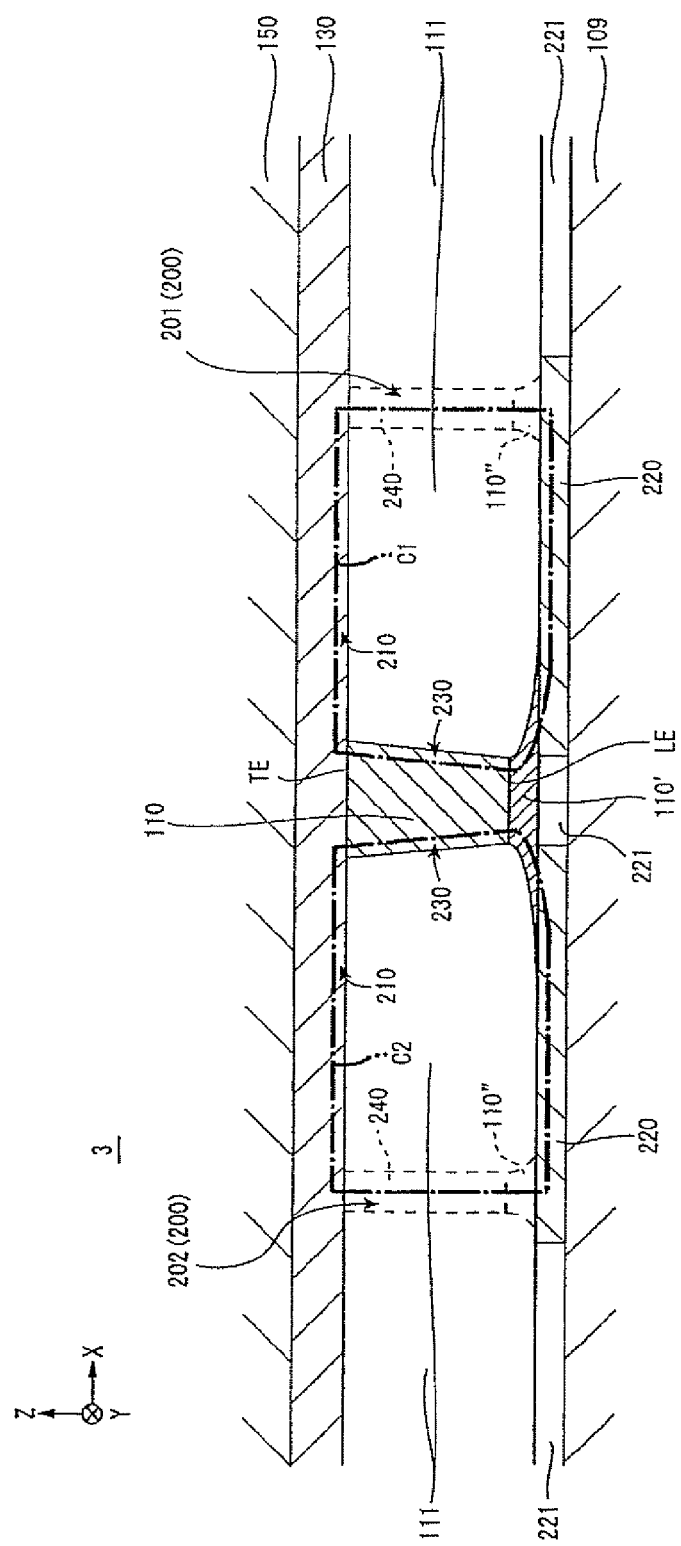
FIG. 13 is a sectional view showing the lamination structure of the perpendicular magnetic recording head in accordance with the third embodiment of the present invention as seen from the medium-opposing surface side.
Figure 14:
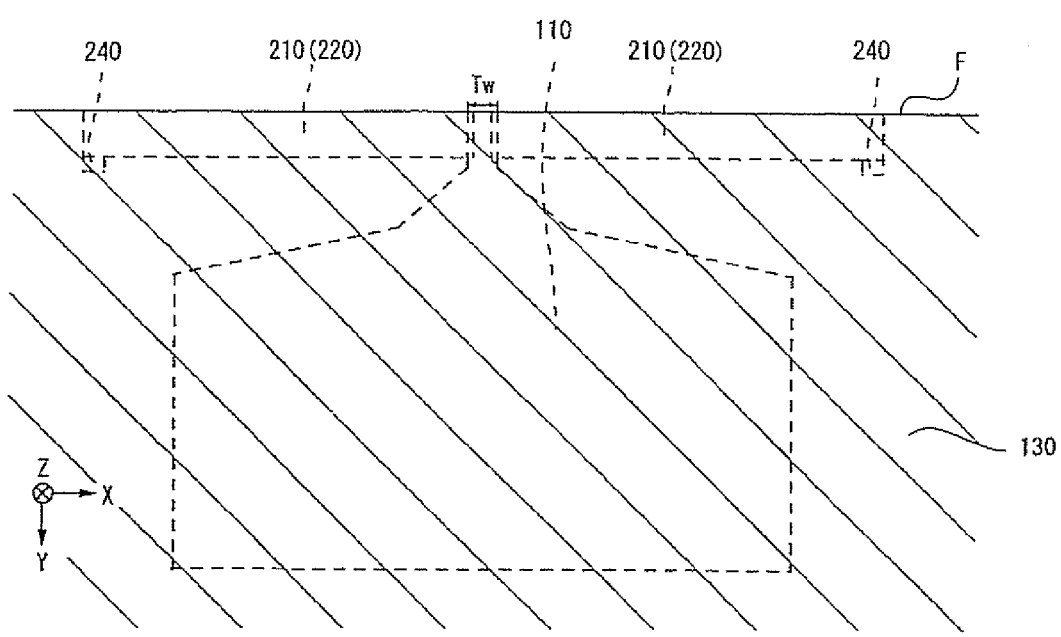
FIG. 14 is a plan view showing the positional relationship between the pair of side coils and main magnetic pole layer in FIG. 13 as seen from the upper side.

FIGS. 13 and 14 show the perpendicular magnetic recording head 3 in accordance with a third embodiment of the present invention. The perpendicular magnetic recording head 3 is a modified example of the first embodiment in which a pair of side coils 200 are provided in a state electrically connected to both of the main magnetic pole layer 110 and return yoke layer 150. More specifically, the magnetic gap layer 130 is formed by a nonmagnetic metal material such as Ru, for example, and constitutes the upper layers 210 of the pair of side coils 200. The pair of side coils 200 construct closed circuits C1, C2 by the magnetic pole part 110A, magnetic gap layer 130, lower layers 220, and outer contact layers 240 and are electrically conducted to the return yoke layer 150 through the magnetic gap layer 130. The third embodiment is the same as the first embodiment except for the structures of the magnetic gap layer 130 and the upper layers 210 of the pair of side coils 200.

FIG. 15 shows the perpendicular magnetic recording head 4 in accordance with a fourth embodiment of the present invention. The perpendicular magnetic recording head 4 is a modified example of the third embodiment which further comprises intermediate layers 250, interposed between the coil insulating layer 109 and plating foundation layer 110', extending in the track width direction and contact layers 260 extending in the laminating direction from both sides in the track width direction of the intermediate layers 250 to the lower layers 220, while the pair of side coils 200 are provided within the coil insulating layer 109. The intermediate layers 250 and contact layers 260 are not exposed at the medium-opposing surface F but positioned at the rear ends in the height direction of the lower layers 220. The step of forming the first coil layer 108 can simultaneously form the lower layers 220. The fourth embodiment is the same as the third embodiment except for the structures of the lower layers 220, intermediate layers 250, and contact layers 260.

When a leakage magnetic flux from the magnetic pole part 110A is about to pass through a pair of side coils 200 in each of the foregoing embodiments, a demagnetizing field H occurs within the pair of side coils 200 in such a direction as to cancel a magnetic flux change thereof, so as to suppress the leakage magnetic flux reaching the recording medium M, whereby side fringing can be suppressed. At the same time, the recording magnetic flux directed from the magnetic pole part 110A to the recording medium M does not pass through the pair of side coils 200 and thus is not affected by the demagnetizing field H, whereby the recording magnetic field intensity can be kept from decreasing. As a consequence, both of the recording magnetic field gradient and recording magnetic field intensity can be maintained favorably, whereby an improvement in recording performances and narrower tracks can be realized.

What is claimed is:

1. A perpendicular magnetic recording head comprising a main magnetic pole layer and a return yoke layer, the main magnetic pole layer and return yoke layer being laminated with a magnetic gap layer interposed therebetween on a surface opposing a recording medium and magnetically coupled to each other on a deeper side of the medium-opposing surface in a height direction, the perpendicular magnetic recording head performing a recording action by applying a perpendicular recording magnetic field from a magnetic pole part exposed at the medium-opposing surface of the main magnetic pole layer to the recording medium;
   wherein a pair of side coils constituting respective electrically closed circuits on a surface parallel to the medium-opposing surface is provided with the side coils respectively located on opposite sides in a track width direction of the magnetic pole part of the main magnetic pole layer, the pair of side coils generating a demagnetizing field in such a direction as to cancel a magnetic flux change caused by a leakage magnetic flux generated from the magnetic pole part, wherein the pair of side coils has a front part exposed at the medium-opposing surface.

2. A perpendicular magnetic recording head according to claim 1, wherein the pair of side coils is formed by a nonmagnetic metal material film containing at least one of Ru, Ta, Au, W, Cr, Ti, Ni, Rh, Pd, Al, Cu, Ag, Sn, and Zr or a multilayer body thereof.

3. A perpendicular magnetic recording head comprising a main magnetic pole layer and a return yoke layer, the main magnetic pole layer and return yoke layer being laminated with a magnetic gap layer interposed therebetween on a surface opposing a recording medium and magnetically coupled to each other on a deeper side of the medium-opposing surface in a height direction, the perpendicular magnetic recording head performing a recording action by applying a perpendicular recording magnetic field from a magnetic pole part exposed at the medium-opposing surface of the main magnetic pole layer to the recording medium;

wherein a pair of side coils constituting respective electrically closed circuits on a surface parallel to the medium-opposing surface is provided with the side coils respectively located on opposite sides in a track width direction of the magnetic pole part of the main magnetic pole layer, the pair of side coils generating a demagnetizing field in such a direction as to cancel a magnetic flux change caused by a leakage magnetic flux generated from the magnetic pole part, and wherein the side coils are respectively in partial contact with opposite side faces in the track width direction of the magnetic pole part.

4. A perpendicular magnetic recording head comprising a main magnetic pole layer and a return yoke layer, the main magnetic pole layer and return yoke layer being laminated with a magnetic gap layer interposed therebetween on a surface opposing a recording medium and magnetically coupled to each other on a deeper side of the medium-opposing surface in a height direction, the perpendicular magnetic recording head performing a recording action by applying a perpendicular recording magnetic field from a magnetic pole part exposed at the medium-opposing surface of the main magnetic pole layer to the recording medium;

wherein a pair of side coils constituting respective electrically closed circuits on a surface parallel to the medium-opposing surface is provided with the side coils respectively located on opposite sides in a track width direction of the magnetic pole part of the main magnetic pole layer, the pair of side coils generating a demagnetizing field in such a direction as to cancel a magnetic flux change caused by a leakage magnetic flux generated from the magnetic pole part, and wherein the pair of side coils is partly constituted by the magnetic pole part.

5. A perpendicular magnetic recording head comprising a main magnetic pole layer and a return yoke layer, the main magnetic pole layer and return yoke layer being laminated with a magnetic gap layer interposed therebetween on a surface opposing a recording medium and magnetically coupled to each other on a deeper side of the medium-opposing surface in a height direction, the perpendicular magnetic recording head performing a recording action by applying a perpendicular recording magnetic field from a magnetic pole part exposed at the medium-opposing surface of the main magnetic pole layer to the recording medium;

wherein a pair of side coils constituting respective electrically closed circuits on a surface parallel to the medium-opposing surface is provided with the side coils respectively located on opposite sides in a track width direction of the magnetic pole part of the main magnetic pole layer, the pair of side coils generating a demagnetizing field in such a direction as to cancel a magnetic flux change caused by a leakage magnetic flux generated from the magnetic pole part, and wherein the magnetic gap layer is made of a nonmagnetic metal material, and wherein the pair of side coils is partly in contact with the magnetic gap layer and electrically connected to the return yoke layer through the magnetic gap layer.

6. A perpendicular magnetic recording head comprising a main magnetic pole layer and a return yoke layer, the main magnetic pole layer and return yoke layer being laminated with a magnetic gap layer interposed therebetween on a surface opposing a recording medium and magnetically coupled to each other on a deeper side of the medium-opposing surface in a height direction, the perpendicular magnetic recording head performing a recording action by applying a perpendicular recording magnetic field from a magnetic pole part exposed at the medium-opposing surface of the main magnetic pole layer to the recording medium;

wherein a pair of side coils constituting respective electrically closed circuits on a surface parallel to the medium-opposing surface is provided with the side coils respectively located on opposite sides in a track width direction of the magnetic pole part of the main magnetic pole layer, the pair of side coils generating a demagnetizing field in such a direction as to cancel a magnetic flux change caused by a leakage magnetic flux generated from the magnetic pole part, wherein the magnetic gap layer is made of a nonmagnetic metal material, and wherein the pair of side coils is partly constituted by the magnetic gap layer and electrically connected to the return yoke layer through the magnetic gap layer.

7. A perpendicular magnetic recording head comprising a main magnetic pole layer and a return yoke layer, the main magnetic pole layer and return yoke layer being laminated with a magnetic gap layer interposed therebetween on a surface opposing a recording medium and magnetically coupled to each other on a deeper side of the medium-opposing surface in a height direction, the perpendicular magnetic recording head performing a recording action by applying a perpendicular recording magnetic field from a magnetic pole part exposed at the medium-opposing surface of the main magnetic pole layer to the recording medium;

wherein a pair of side coils constituting respective electrically closed circuits on a surface parallel to the medium-opposing surface is provided with the side coils respectively located on opposite sides in a track width direction of the magnetic pole part of the main magnetic pole layer, the pair of side coils generating a demagnetizing field in such a direction as to cancel a magnetic flux change caused by a leakage magnetic flux generated from the magnetic pole part, wherein the pair of side coils is formed by a nonmagnetic metal material film containing at least one of Ru, Ta, Au, W, Cr, Ti, Ni, Rh, Pd, Al, Cu, Ag, Sn, and Zr or a multilayer body thereof, and wherein the pair of side coils has a front end part exposed at the medium-Opposing surface, at least the front end part being formed by one of Ru, Ta, Au, W, Cr, Ti, and Rh or a multilayer body thereof.

* * * * *